Sept. 9, 1930. J. A. LA BILLE 1,775,284
AIR NAVIGATING MACHINE
Filed March 21, 1929
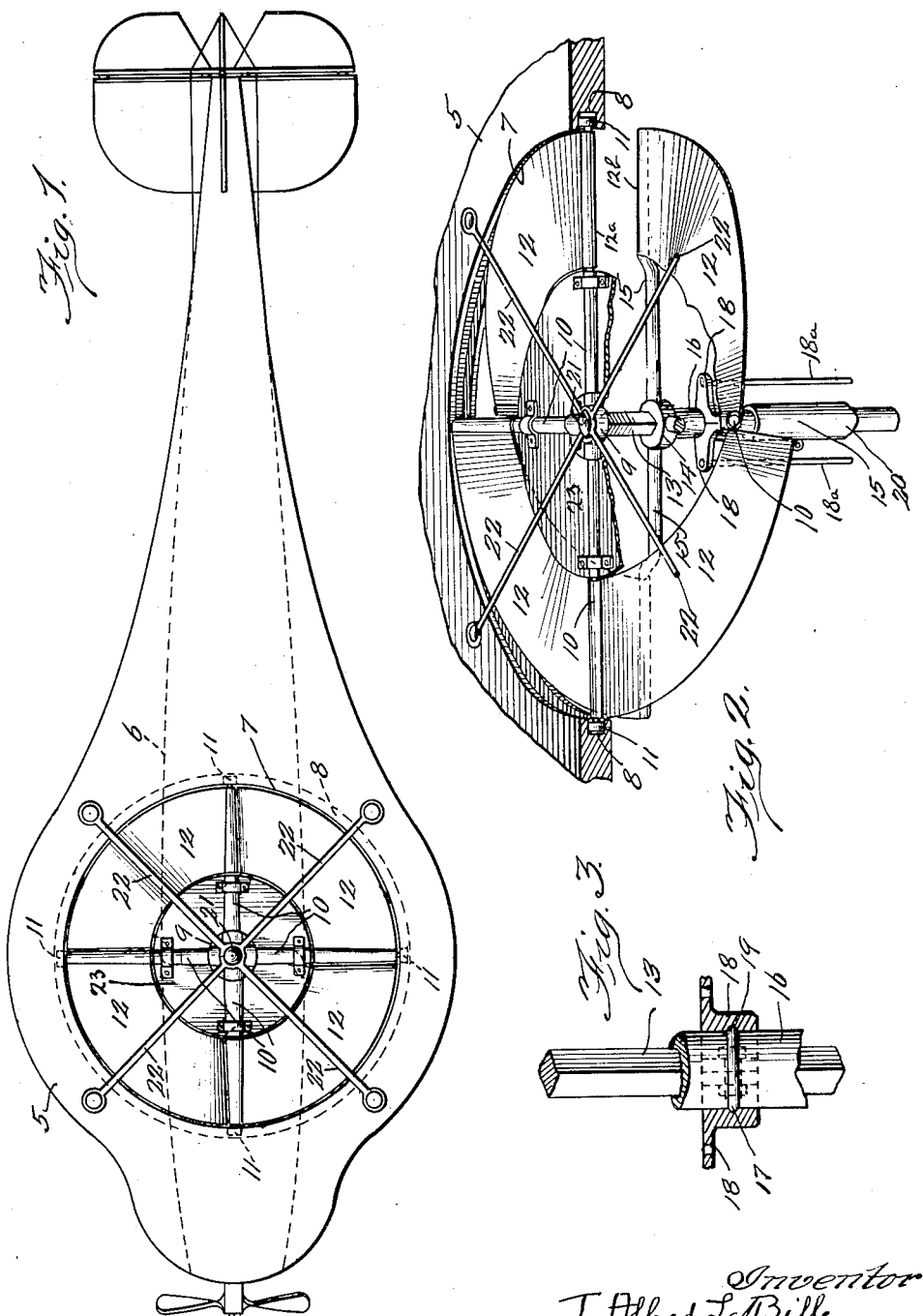
Inventor:
J. Alfred LaBille
By Winfield Williams
Atty.

Patented Sept. 9, 1930

1,775,284

UNITED STATES PATENT OFFICE

JOSEPH ALFRED LA BILLE, OF CHICAGO, ILLINOIS, ASSIGNOR OF ONE-HALF TO WILLIAM G. HANNAN, OF CHICAGO, ILLINOIS

AIR NAVIGATING MACHINE

Application filed March 21, 1929. Serial No. 348,723.

My invention relates to aircraft, and specifically to a means for lifting such a machine from a position of rest substantially vertically into the atmosphere.

The main object of my invention is a simple mechanism to raise a type of machine adapted to navigate the air. Another object is to provide such a device as will form a plane surface with the plane of the machine after it has reached a predetermined height and determines to move forward. Another object is the provision of a device such that in the event of any inefficiency or default on the part of the propelling mechanism of the machine, my device can be thrown into action and effect a descent of the machine under similar conditions to the ascent of the machine, thus providing a safety feature in the operation of an aircraft.

I show an embodiment of my device in the accompanying drawing in which Fig. 1 is a top plan view. Fig. 2 is a partial elevation of the specific form of my device in a broken section of the supporting plane, showing the device in the position which it would assume when lifting the aircraft. Fig. 3 is a detail of a manipulating portion of the device.

As illustrated I show a type of aircraft wherein the supporting means is longitudinal, but the application of my device may be just as readily had with an aircraft where the supporting means is lateral to the fuselage. In describing my device and its application I use the words "supporting plane" as referring to that portion of such a mechanism as is always ordinarily intended as a general support for the machine, sometimes called the wings, and the word "plane" as referring to a certain hereinafter described member which under certain conditions forms part of the supporting plane. As illustrated, 5 is the supporting plane and 6 (shown in dotted lines) indicates in general the fuselage and other paraphernalia of the aircraft. In a portion of the plane 5 I provide an aperture 7 in the circular edge of which I provide a channel or groove 8. Operating in the circular aperture 7 I provide a mechanism consisting of a collar 9 to which are attached radial arms 10 on the outer ends of which radial arms 10 are bearings 11 adapted to function in the channel 8 of the plane 5. These radial arms 10 connected with the collar 9 are fixed upon a shaft 13. Functionally attached to the arms 10 are plane portions 12 forming segments of a circle, having at 12ª a certain freedom of swinging movement on the said arms. I provide a collar 14 slidably mounted on the shaft 13 below the collar 9, the said collar 14 having fixedly attached thereto radial arms 15, and having means for engagement with portions of the planes 12, said planes having at 12ᵇ a certain limited movement in connection with the radial arms 15. The shaft 13 is squared over a portion thereof so that a portion 16 of the collar 14 movably mounted thereon will rotate the lower collar 14 in unison with the collar 9 at any point in their revolution. The arms 15 are offset adjacent the planes 12, and the planes 12, each extending from an arm 10 to an arm 15, are adjusted so that when the collar 14 is raised to a position immediately adjacent to the fixed collar 9, the planes 12 will touch, end for end, with each adjacent plane 12 and thus form a continuous plane surface, but when the said collars are separated at various distances, the said planes 12 will bear to each other such a relation that they will be helical in their movements. 16 is a circular outer portion of 14 on the squared shaft 13, and on this circular outer portion 16 I provide an annular ridge or bead 17 which bead works in an annular channel 19 in a functioning mechanism consisting of a pair of clamping members 18. These clamping members have functioning devices 18ª with which to raise and lower the collar 14 with its attached arms and plane portions. 20 is a fixed bearing for the support of the shaft in which the said shaft freely rotates. 21 is an upper portion of the shaft 13 operating in a bearing formed at the junction of stabilizing arms 22, which said stabilizing arms are bridged over the aperture 7 and anchored on the plane 5. A disc 23 is attached to the collar 9 and the arms 10, substantially closing the space inside the planes 12.

In the operation of my device the working mechanism is driven from a power in the aircraft, and this power may be either the power from the machine which is ordinarily used in propelling the machine, or it may be power from a separate individual power organization. The size of the elevating mechanism is dependent upon the conditions of the weight to be lifted. The device provides that when the craft is at a standstill the planes of the propeller may be horizontally positioned in the supporting plane or wings and the revolving mechanism be set into motion with a minimum resistance until it has obtained a desirable speed, when the angle of the revolving planes may be altered to such a gradual rise as may be deemed necessary until the full activity of the revolving planes has lifted the craft to a desirable altitude, at which time the revolving planes may be again brought to a position horizontal with the supporting plane or wing when it again becomes a substantial part of the supporting plane. It will also be readily seen that in the event of an emergency the said operative mechanism will operate to accomplish a descent of the machine in order similar to its ascent.

I do not limit myself to any specific application of my device as to form of machine or type of mechanism, except in so far as I am limited by the scope of my claims.

I claim:

1. In an aircraft the combination with the supporting planes of a lifting mechanism comprising a power propelled shaft, fixed to an upper portion of said shaft a plurality of radiating arms, an aperture formed in the surface of the supporting plane and having a channel cut in the edge of said aperture, means upon the outer ends of said radial arms adapted to have bearing in said channel and provide outer support for the said radial arms, functionally associated with each of said radial arms a web member constituting a segment of a circle; the continuity of said web members when in horizontal position constituting a complete circle, movably assembled on the shaft below a collar member having a set of arms radiating therefrom, the said arms being so positioned that each one is slightly offset from a corresponding arm in the fixed upper arms, and at a certain position each arm of the movable member being offset so that when the lower movable member is brought into conjunction with the fixed member the outer portion of each radial arm will lie in the same plane, each web member being functionally associated with one of the upper arms and one of the lower arms and each of said web members being adapted to extend such distance between an upper and a lower arm as will make a complete circle when the said upper and lower arms are brought into juxtaposition, being adapted when separated to form a practically spiral position with reference to each other; means to function the lower arms so as to bring the web portions into various positions whereby to change the inclination of each web portion from a continuous flat surface to a helical position.

2. In combination with an aircraft a fixed supporting member commonly denominated a wing, an aperture in said member, a lifting mechanism assembled in and operable in association with said wing and aperture comprising a hub with radiating spokes fixed to a revolving shaft and an adjacent hub with radiating spokes slidable on said shaft in a direction toward and away from the fixed hub, the radiating spokes on the slidable hub so formed and positioned with relation to corresponding spokes on the fixed hub that when the slidable hub is brought into immediate contact with the fixed hub an outer portion of each spoke will lie in the same horizontal plane with an adjacent spoke, means extending from each upper spoke to a complementary lower spoke consisting of a plane member so positioned and related that when the slidable hub is moved away from the fixed hub the inclination of the plane members constitute a propeller and when the said slidable hub is brought into juxtaposition with the fixed hub the planes form an unbroken surface with the wing surface.

Signed at Chicago, Ill., this 13th day of March, 1929.

J. ALFRED LA BILLE.